June 26, 1962 J. A. LAUBER 3,040,623

SPECTACLE FRAME

Filed June 29, 1959 2 Sheets-Sheet 1

INVENTOR.
JOHN A. LAUBER.
BY
Lockwood, Woodard, Smith + Weikart.
ATTORNEYS.

June 26, 1962 J. A. LAUBER 3,040,623

SPECTACLE FRAME

Filed June 29, 1959 2 Sheets-Sheet 2

INVENTOR.
JOHN A. LAUBER,

BY

Lockwood, Woodard, Smith & Weikart,
ATTORNEYS.

United States Patent Office 3,040,623
Patented June 26, 1962

3,040,623

SPECTACLE FRAME

John A. Lauber, Clearwater, Fla., assignor to Continental Optical Company, Inc., Indianapolis, Ind., a corporation Filed June 29, 1959, Ser. No. 823,628
6 Claims. (Cl. 88—41)

The present invention relates to a spectacle frame and relates more particularly to a means for attaching a decorative plastic or metallic top arm of the frame to metallic eyewires thereof.

Spectacles with decorative plastic or metallic top arms and metallic eyewires for supporting the lenses combine the pleasing appearance of colorful frames with the strength and the full view feature in the lower visual portions of a metal spectacle frame. Interchangeable plastic or metallic top arm portions make it possible for a wholesaler or manufacturing retailer to offer a wide variety of style and color combinations without stocking an undue number of frames. The top arm portions may be supplied in a number of styles and colors and may be used interchangeably with a wide variety of metal frame portions having different styles and sizes of bridges.

At the present time, the standard construction for such combination type spectacle frames provide aligned holes in the top arms and a threaded hole in a lug mounted on the eyewire (or a threaded hole in the foot of the bridge member). These three holes are aligned and a tiny screw which is called an anchor lug screw is threadedly received within the holes to hold the top arm firmly in place. Because of its small size, the anchor lug screw is the bane of the laboratory technician. It is difficult to hold the screw while inserting it in such holes and therefore the time consumed by the use of such a screw is excessive. Because of the small size of the screw necessary, there is little threading performance thus permitting the screw to loosen and fall out at times.

It is therefore an object of the present invention to provide a rapid, easily manipulated and secure means for attaching the top arm of a combination spectacle frame to the eyewire thereof.

Another object of the present invention is to provide a novel means for fastening a top arm to the eyewire of a spectacle frame, said fastening being concealed and inconspicuous, so as to obtain a spectacle frame which is pleasing to the eye and flattering to the appearance of the wearer.

Still further objects will appear as the description proceeds.

The full nature of the invention will be understood from the accompanying drawings and the following description and claims:

Figures 1, 2, 3, 4, 5, 6:
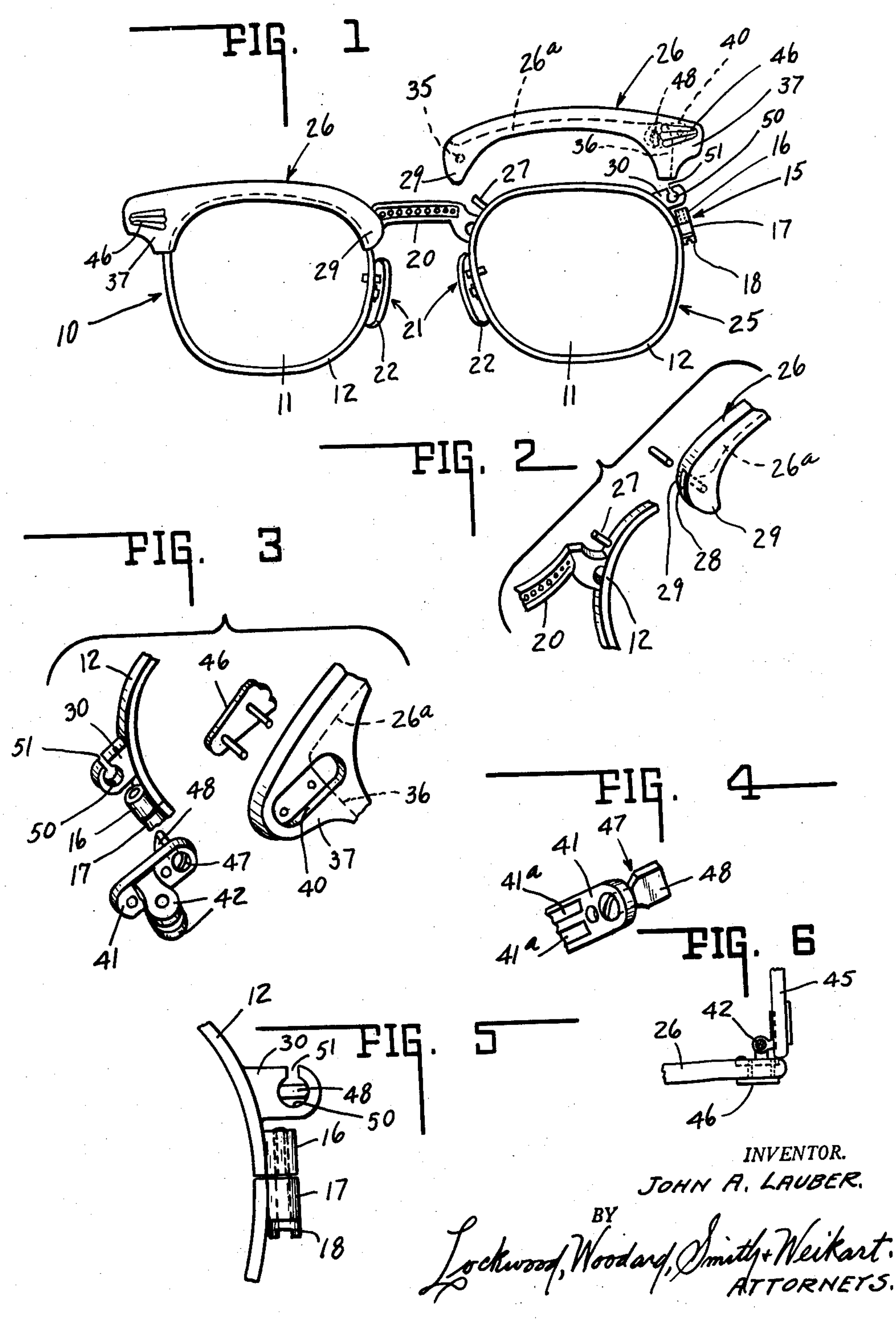
FIG. 1 is a front elevation of a pair of spectacles embodying my invention, one of the top arm portions thereof being removed from the frame and shown as in an exploded view.
FIG. 2 is an exploded, perspective fragmentary view of a portion of the bridge and adjacent structure of the spectacles of FIG. 1.
FIG. 3 is an exploded fragmentary perspective view of one temporal end of the spectacles of FIG. 1 with the temple thereof removed.
FIG. 4 is a perspective view of a hinge plate and a stud rotatably mounted in the hinge plate, both of which form a portion of the structure of FIG. 1.
FIG. 5 is a fragmentary front elevation of the temporal end of an eyewire showing a lug and clamping means secured to the eyewire and showing the position of a flattened portion of the stud when the top arm is secured, all of which form a portion of the spectacles of FIG. 1.
FIG. 6 is a fragmentary top plan view of one temporal end of the spectacles of FIG. 1 showing a temple pivotally connected thereto.

Referring now to the drawings, the spectacles 10 comprise lenses 11—11 which are mounted within eyewires 12, the eyewires surrounding and conforming to the outer shape of the lenses 11. Each eyewire 12 is secured about its respective lens by a clamping means 15 which includes a pair of tubes 16 and 17 and a screw 18. The tube 16 is internally threaded for threaded reception of the screw 18 which may be tightened down to retain the lens within the eyewire 12. The eyewires 12 are secured to either end of a metal bridge 20 by soldering or otherwise. A nasal assembly 21 is secured to the nasal side of each eyewire 12 by soldering or otherwise and includes a nose pad 22 and associated parts for attaching the nose pad to the eyewire.

The eyewires 12, the bridge 20, and the clamping means 15 form a metallic lens-retaining unit which, with the nasal assemblies 21, constitutes a rigid metal spectacle front 25 to which the top arms 26 are detachably secured. The retainer pins 27 and the lugs 30 are also integral parts of the metallic lens-retaining unit as will later be described.

The top arms 26 may be formed of any material such as plastic or metallic material shaped and colored to be pleasing to the eye and are formed so as to generally conform to the upper edges of the eyewires 12. A groove or recess **26*a* extends along the lower edge of each top arm 26 and is arranged to receive and partially conceal the upper section of the eyewire 12. The top arm 26 is slotted at the nasal end thereof so as to form the slot 28 which forms an extension of the groove 26*a* and so as to form the projecting legs 29—29 on either side of slot 28. Each top arm 26 is connected to the nasal end of the eyewire 12 by hooking a pin 35, which is mounted in the legs 29 of the top arm 26 to extend through slot 28, over the retainer pin 27 which is fixed to its metallic eyewire so as to extend somewhat radially therefrom. It can be seen that the two projecting legs 29 of the top arm 26 extend on either side of the bridge 20** and engage the bridge to support the top arm from the bridge.

The temporal end of each top arm 26 extends downwardly along the temporal side of the associated eyewire 12 so as to conceal the associated clamping means 15 and lug 30, the clamping means and lug being received within a vertical recess 36 which forms an extension of the groove **26*a*. Each top arm 26 is formed with a temporal extension 37 within the rearward face of which is formed a recess 40 which intersects a portion of the recess 36. A hinge plate 41 having a pair of projections 42 for pivotal mounting of the temple 45 thereon is received within each recess 40 and is fixed therein by means of rivets which extend from a decorative plaque 46 located at the forward side of the top arm 26**.

A stud 47 is rotatably mounted within the hinge plate 41 and has, at its rearward end, a slotted head similar to a screw head for the reception of a means to rotate the stud. The stud 47 has a flattened end portion 48 which, when the hinge plate 41 is received within the recess 40, extends into and across the vertical recess 36.

Each lug 30 is fixed to the temporal end of its associated eyewire 12 just above the clamping means 15 by soldering or otherwise and is formed with an aperture 50 which has a diameter sufficiently greater than the width of the flattened portion of the stud 47 so that the stud 47 may be rotated within the aperture 50.

A slot 51 extends from the upper edge of each lug 30 and opens into the associated aperture 50 of the lug. The slot 51 is arranged at such an angle that, when the flattened portion 48 of the stud 47 is rotated to the proper position, each top arm 26 may be hooked upon the respective retainer pin 27, by means of pin 35, and swung downwardly onto the eyewire 12, the flattened portion 48 of the stud passing through the slot 51 into the aperture 50.

The slot 51 has a sufficiently small transverse dimension so that, when the stud is rotated through an angle of approximately ninety degrees within the aperture 50 to a position wherein the flattened portion is out of alignment with the slot (see FIG. 5), the stud will be retained within the aperture 50 and the top arm is securely attached to the metallic lens-retaining unit.

It will be obvious from the above description that the flattened stud and slotted lug arrangement of the present invention provides, in comparison to the conventional anchor lug screw, a much more rapid and easily manipulated means of attaching a top arm to a metallic lens-retaining unit. It should be noted that in manufacturing the present device the stud may be placed within its aperture in the hinge plate and then flattened at its end whereby the flattened portion of the stud is larger than the aperture in the hinge plate and prevents the stud from dropping out of the hinge plate during use.

Figure 7:
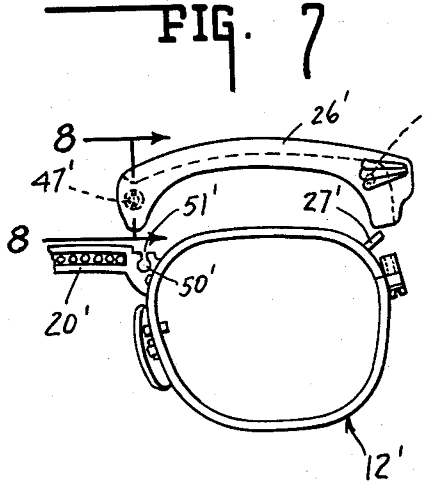
FIG. 7 is a fragmentary front elevation similar to FIG. 1 of an alternative embodiment of the invention.

Referring to FIG. 7, an alternative embodiment of the invention is illustrated as identical to the embodiment of FIGS. 1–6 with the exception that the position of the projecting retainer pin 27 and the lug 30 (and the corresponding hooking pin 35 and stud 47) are reversed. In the embodiment of FIG. 7, instead of a separate lug, the bridge 20′ is formed with an aperture 50′ and a slot 51′ opening into the aperture. The slot 51′ is arranged at such an angle, that, when the flattened portion 48′ of the stud 47′ is rotated to the proper position, the top arm 26′ may be hooked upon the retainer pin 27′, by means of pin 35′, and swung downwardly onto the eyewire 12′, the flattened portion 48′ of the stud passing through the slot 51′ into the aperture 50′. The stud 47′ may be rotatably mounted within a washer 75 (FIG. 8) which is embedded within a suitable recess in the top arm 26′ and provides a suitable bearing for the rotatable mounting of the stud 47′ within the top arm 26′.

Figure 8:
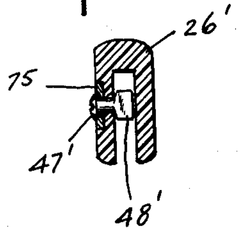
FIG. 8 is an enlarged section taken along the line 8—8 of FIG. 7.
Figure 9:
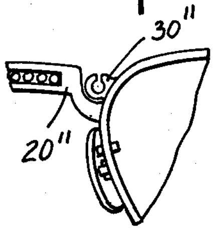
FIG. 9 is a fragmentary front elevation of the metallic lens-retaining unit of still a further embodiment of the invention.

Referring to FIG. 9, the illustrated embodiment is identical to the embodiment of FIGS. 7 and 8 with the exception that the lug 30″ is soldered or otherwise attached to the eyewire as a separate unit from the bridge 20″.

While the invention has been disclosed and described in some detail in the drawings and the foregoing description, they are to be considered as illustrative and not restrictive in character, as other modifications may readily suggest themselves to persons skilled in this art and within the broad scope of the invention, reference being had to the appended claims.

I claim as my invention:

1. In a spectacle frame of the type having a metallic lens-retaining unit and a pair of top arms secured thereto, said unit including a metallic bridge, a pair of metallic eyewires secured to said bridge at either side and adapted to surround a pair of lenses, clamping means at the temporal ends of said eyewires for securing said eyewires around the lenses, said top arms each having a central groove along the lower edge thereof for receiving and concealing the upper portions of the eyewires and the clamping means, projections on said metallic unit adjacent each side of the bridge extending above the adjacent eyewire, each top arm having a slot at its nasal end and having a pin extending across said slot for engaging the adjacent projection, the improvement which comprises lugs adjacent to and above each of said clamping means, said lugs being secured to said metallic unit and being adapted to be concealed in said top arm grooves, each top arm having a temporal extension provided with a central vertical recess along its inner edge forming an extension of said groove and adapted to receive said clamping means and said lug, each of said temporal extensions having a second recess in its rear surface, a portion of said second recess intersecting and communicating with said first recess, a temple hinge plate secured in each of said second recesses and having a portion overlying said intersecting recess portions, means on each hinge plate adapted to pivotally support a temple, studs pivotally received in each hinge plate and extending through said top arm into said first recess, said studs each having an outward face formed for reception of means to pivot said stud, the portion of said stud which extends into said first recess being flattened into a plate-like form which has a width suciently great to retain said stud within said hinge plate and top arm, each of said lugs having an aperture located to receive said stud when the respective top arm is secured to said unit, and having a diameter sufficiently great to allow pivoting of the flattened portion of said stud therein, each of said lugs having a slot extending through said lug upwardly from its respective aperture which slot has a lesser transverse dimension than the width of said flattened portion of said stud but has a sufficiently great transverse dimension to allow passage of the flattened portion therethrough when the flattened portion is aligned with said slot.

2. In a spectacle frame of the type having a metallic lens-retaining unit and a pair of top arms secured thereto, said unit including a metallic bridge and a pair of metallic eyewires secured to said bridge and adapted to surround a pair of lenses, means for securing said top arms to the unit, which comprise a pair of projecting members each of which is secured to one of said eyewires and extends upwardly and outwardly of the eyewire, a pair of lug members each of which is secured to one of said eyewires and extends upwardly and outwardly of the eyewire, one of said pair of members being adjacent each side of the bridge and the other of said pair of members being located at the temporal ends of said eyewires, said top arms each having a recess for reception of one of said lugs, a pair of studs each pivotally mounted in a respective one of said top arms and extending into the recess, the portion of each stud which extends into said recess having a flat configuration, each of said lugs having an aperture which receives the flattened portion of a respective stud when the associated top arm is secured to said metallic unit, said apertures each having a diameter sufficiently great to allow pivoting of the flattened portion of the stud therein, each of said lugs having a slot extending through said lug upwardly from its respective aperture which slot has a lesser transverse dimension than the width of said flattened portion of said stud but has a sufficiently great transverse dimension to allow passage of the flattened portion therethrough when the flattened portion is aligned with said slot.

3. A device for securing a top arm of a spectacle frame to a metallic lens-retaining unit of the frame which comprises means for hooking said top arm to said unit, said unit being formed with an aperture, said top arm having a recess in the lower edge thereof for receiving an upper portion of said unit and for concealing said aperture, a stud pivotally mounted within said top arm and having a flat portion extending into said recess, said unit having a slot extending upwardly from said aperture, said slot and aperture being so proportioned and arranged that said top arm may be hooked by said means and pivoted toward said unit causing said flat portion to pass through said slot into said aperture and said stud may be pivoted to secure said top arm and said unit together.

4. A device for securing a top arm of a spectacle frame to a metallic lens-retaining unit of the frame which comprises means for hooking one end of said top arm to said unit, said unit being formed with an aperture in its upper portion, said top arm having a recess in the lower edge thereof for receiving the upper portion of said unit and for concealing said aperture, a stud pivotally mounted within said top arm at the other end thereof and having a flat portion extending into said recess, said aperture receiving the flattened portion of said stud when said top arm is secured to said unit, said unit having a slot extending upwardly from said aperture and so located and arranged that, when said top arm is hooked by said means and is pivoted toward said unit, said flat portion may be pivoted into alignment with said slot for passage therethrough into said aperture, said flat portion having a sufficient width so that, when it is pivoted in said aperture into a position out of alignment with said slot, said flat portion will not pass through said slot.

5. A device for securing a top arm of a spectacle frame to a metallic lens-retaining unit of the frame which comprises means for hooking one end of said top arm to said unit, said unit being formed with an aperture in its upper portion, said top arm having a recess in the lower edge thereof for receiving the upper portion of said unit and for concealing said aperture, a stud pivotally mounted within said top arm and extending into said recess, the portion of said stud which extends into said recess being flattened into a plate-like form which has a width sufficiently great to retain said stud within said top arm, said aperture receiving the flattened portion of said stud when the top arm is secured to said unit and having a diameter sufficiently great to allow pivoting of the flattened portion of said stud therein, said unit having a slot extending upwardly from said aperture which slot has a transverse dimension which is less than the width of said flattened portion of said stud but is greater than the thickness of the flattened portion, said stud being pivotal to a first position wherein said flattened portion is aligned with and will pass through said slot and to a second position wherein said flattened portion is out of alignment with and and will not pass through said slot.

6. A device for securing a top arm of a spectacle frame to a metallic lens-retaining unit of the frame which comprises a metallic lens retaining unit, a top arm hooked to said unit, said unit being formed with an aperture, said top arm having a downwardly opening recess which receives the portion of said unit having said aperture, a stud pivotally mounted within said top arm and having a flat portion extending into said recess, said unit having a slot extending upwardly from said aperture, said flat portion of said stud being passed through said slot and received in said aperture to lock upon pivoting said top arm to said unit, said stud being pivotal to a position wherein said flat portion passes through said slot for unlocking said top arm from said unit.

References Cited in the file of this patent

UNITED STATES PATENTS

| | | |
|---|---|---|
| 2,385,975 | Ellestad | Oct. 2, 1945 |
| 2,688,273 | Markell | Sept. 7, 1954 |
| 2,748,655 | Rohrbach | June 5, 1956 |
| 2,786,391 | Lutes | Mar. 26, 1957 |
| 2,831,393 | Bennett | Apr. 22, 1958 |

FOREIGN PATENTS

| | | |
|---|---|---|
| 307,043 | Switzerland | July 16, 1955 |
| 744,506 | Great Britain | Feb. 8, 1956 |